United States Patent
Tamai

(10) Patent No.: US 11,283,286 B2
(45) Date of Patent: Mar. 22, 2022

(54) UNINTERRUPTIBLE POWER SUPPLY

(71) Applicant: FUJI ELECTRIC CO., LTD., Kawasaki (JP)

(72) Inventor: Yasuhiro Tamai, Chiba (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 0 days.

(21) Appl. No.: 17/138,000

(22) Filed: Dec. 30, 2020

(65) Prior Publication Data

US 2021/0119475 A1 Apr. 22, 2021

Related U.S. Application Data

(63) Continuation of application No. PCT/JP2019/026741, filed on Jul. 4, 2019.

(51) Int. Cl.
*H02J 9/06* (2006.01)
*H02M 7/02* (2006.01)

(52) U.S. Cl.
CPC .............. *H02J 9/061* (2013.01); *H02M 7/02* (2013.01)

(58) Field of Classification Search
USPC ......................................................... 307/66
See application file for complete search history.

(56) References Cited

U.S. PATENT DOCUMENTS 9,755,457 B2  9/2017 Lee et al.

FOREIGN PATENT DOCUMENTS

| JP | 2004-132937 A | 4/2004 |
| JP | 2010-172148 A | 8/2010 |
| JP | 2010172148 | * 8/2010 |
| JP | 2011-010513 A | 1/2011 |
| JP | 6262675 B2 | 1/2018 |
| JP | 2018-098960 A | 6/2018 |
| JP | 2018098960 | * 6/2018 |

OTHER PUBLICATIONS

PCT/ISA/210, "International Search Report for International Application No. PCT/JP2019/026741," dated Aug. 27, 2019.
PCT/ISA/237, "Written Opinion by the International Search Authority for International Application No. PCT/JP2019/026741," dated Aug. 27, 2019.

* cited by examiner

*Primary Examiner* — Toan T Vu
*Assistant Examiner* — Xuan Ly
(74) *Attorney, Agent, or Firm* — Manabu Kanesaka

(57) ABSTRACT

An uninterruptible power supply includes a first detector provided on an input side of a power converter, the first detector detecting a first detection value that is a value of a voltage or current, and a second detector provided on an AC power supply side relative to the first detector, the second detector detecting a second detection value that is a value of a voltage or current input to the uninterruptible power supply module.

12 Claims, 10 Drawing Sheets

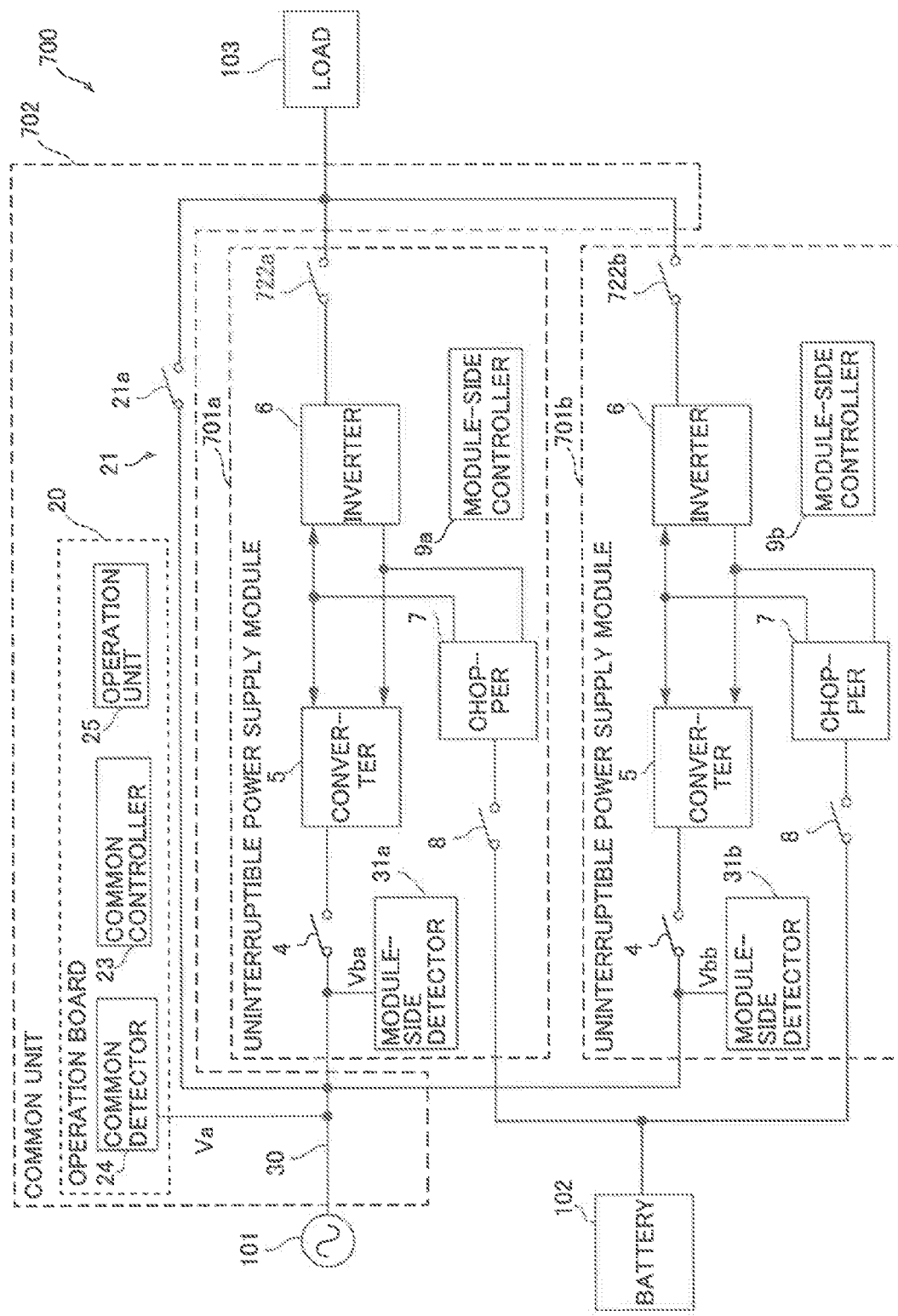

UNINTERRUPTIBLE POWER SUPPLY

CROSS-REFERENCE TO RELATED APPLICATION

This application is a continuation of PCT application PCT/JP2019/026741, filed on Jul. 4, 2019.

BACKGROUND OF THE INVENTION

Field of the Invention

The present invention relates to an uninterruptible power supply.

Description of the Background Art

An uninterruptible power supply including a power converter is known in general. Such an uninterruptible power supply is disclosed in Japanese Patent No. 6262675, for example.

Japanese Patent No. 6262675 discloses an uninterruptible power supply system including uninterruptible power supply modules each including a converter and an inverter. The uninterruptible power supply system includes a plurality of uninterruptible power supply modules connected in parallel to each other. When AC power is supplied from an AC power supply (when there is no power failure), in each of the plurality of uninterruptible power supply modules, the converter converts the AC power from the AC power supply into DC power, and supplies the DC power to the inverter and a battery. The inverter of each of the plurality of uninterruptible power supply modules converts the DC power from the converter into AC power and outputs the AC power to the load side. In the event of a power failure in which AC power supply from the AC power supply is stopped, in each of the plurality of uninterruptible power supply modules, the operation of the converter is stopped, and the DC power is supplied from the battery to the inverter. The inverter of each of the plurality of uninterruptible power supply modules converts the DC power from the battery into AC power and outputs the AC power to the load side.

Although not disclosed in Japanese Patent No. 6262675, in a conventional uninterruptible power supply system as disclosed in Japanese Patent No. 6262675, an abnormality may conceivably occur in a detector that detects whether or not AC power is being supplied from an AC power supply (whether or not there is a power failure). For example, an abnormality of an electronic component in the detector or an abnormality of wiring between the detector and the AC power supply may conceivably occur. In this case, in the conventional uninterruptible power supply system, it is conceivably difficult to continue the operation based on the detection result of the detector. Although not disclosed in Japanese Patent No. 6262675, in the conventional uninterruptible power supply system, when an abnormality occurs in the detector, a control to stop the operation of the converter and supply the DC power from the battery to the inverter is conceivably performed even when AC power is being supplied from the AC power supply (even when there is no power failure). In this case, in the conventional uninterruptible power supply system (uninterruptible power supply), when an abnormality occurs in the detector, the amount of power stored in the battery is disadvantageously decreased.

SUMMARY OF THE INVENTION

The present invention has been proposed in order to solve the aforementioned problem, and an object of the present invention is to provide an uninterruptible power supply capable of significantly reducing or preventing a decrease in the amount of power stored in a battery even when an abnormality occurs in a detector.

In order to attain the aforementioned object, an uninterruptible power supply according to an aspect of the present invention includes an uninterruptible power supply module including a power converter, a first detector provided on an input side of the power converter, the first detector detecting a first detection value that is a value of a voltage or current input to the power converter, and a second detector provided on an AC power supply side relative to the first detector, the second detector detecting a second detection value that is a value of a voltage or current input to the uninterruptible power supply module.

As described above, the uninterruptible power supply according to this aspect of the present invention includes the second detector that is provided on the AC power supply side relative to the first detector and detects the second detection value, which is a value of a voltage or current input to the uninterruptible power supply module. Accordingly, when only one of the first detection value of the first detector and the second detection value of the second detector is an abnormal value, it can be presumed that an abnormality (a failure in the detector itself) has occurred in the detector itself that detects an abnormal value. When both the first detection value of the first detector and the second detection value of the second detector are abnormal values, it can be presumed by the first detector and the second detector that the first detector and the second detector itself are normal, but an abnormality (a power failure) has occurred in power from an AC power supply. Therefore, when one of the first detector and the second detector detects an abnormal value, the operation of the power converter of the uninterruptible power supply module can be continued based on a detection value of the other of the first detector and the second detector indicating a normal value. Consequently, even when an abnormality occurs in either the first detector or the second detector, power supply to a load side can be continued without using power stored in a battery as long as the power from the AC power supply is supplied (unless there is a power failure). Thus, even when an abnormality occurs in the detector (either the first detector or the second detector), a decrease in the amount of power stored in the battery can be significantly reduced or prevented.

In the aforementioned uninterruptible power supply according to this aspect, the uninterruptible power supply module preferably includes a plurality of uninterruptible power supply modules, the plurality of uninterruptible power supply modules is preferably connected to a common AC power supply, the first detector includes a plurality of first detectors provided on input sides of power converters of the plurality of uninterruptible power supply modules, respectively, and the second detector preferably detects the second detection value in the common AC power supply. Accordingly, even when the uninterruptible power supply includes the plurality of uninterruptible power supply modules, the second detector can be shared with the plurality of uninterruptible power supply modules, and thus an increase in the number of components of the uninterruptible power supply can be effectively significantly reduced or prevented even when the second detector is provided.

In this case, the uninterruptible power supply preferably further includes a controller configured to perform a power converter power supply control to supply power from the AC power supply to a load side via the power converters of the plurality of uninterruptible power supply modules when a plurality of first detection values detected by the plurality of first detectors is within a first normal range and the second detection value is within a second normal range, the controller being configured to perform a battery power supply control to control the plurality of uninterruptible power supply modules to supply power from a battery to the load side when the second detection value is outside the second normal range. When a plurality of uninterruptible power supply modules is provided in an uninterruptible power supply and one detector is provided in each of the plurality of uninterruptible power supply modules, detection values conceivably vary due to individual differences in the detectors of the plurality of uninterruptible power supply modules, for example. In this case, a controller of each of the plurality of uninterruptible power supply modules switches a power converter power supply control to a battery power supply control based on the varying detection values such that in the plurality of uninterruptible power supply modules, the uninterruptible power supply module that performs the power converter power supply control and the uninterruptible power supply module that performs the battery power supply control are conceivably mixed. In other words, the uninterruptible power supply module that supplies power to the battery and the uninterruptible power supply module that acquires power from the battery may conceivably be mixed. Therefore, when the plurality of uninterruptible power supply modules is connected to a common battery, current return may conceivably occur between the plurality of uninterruptible power supply modules via the battery. In this regard, according to the present invention, as described above, the controller is configured to perform the power converter power supply control to supply the power from the AC power supply to the load side via the power converters of the plurality of uninterruptible power supply modules when the plurality of first detection values detected by the plurality of first detectors is within the first normal range and the second detection value is within the second normal range, and is configured to perform the battery power supply control to control the plurality of uninterruptible power supply modules to supply the power from the battery to the load side when the second detection value is outside the second normal range. Accordingly, it is possible to switch between the power converter power supply control performed by all of the plurality of uninterruptible power supply modules and the battery power supply control performed by all of the plurality of uninterruptible power supply modules, and thus mixing of the uninterruptible power supply module that performs the power converter power supply control with the uninterruptible power supply module that performs the battery power supply control can be significantly reduced or prevented. Consequently, even when the plurality of uninterruptible power supply modules is connected to the common battery, current return between the plurality of uninterruptible power supply modules via the battery can be significantly reduced or prevented.

In the aforementioned uninterruptible power supply including the controller, the controller is preferably configured to, when performing the power converter power supply control, perform a control to determine that the first detector of the uninterruptible power supply module, the first detection value of which is outside the first normal range, among the plurality of uninterruptible power supply modules is abnormal when the second detection value is within the second normal range. Accordingly, the abnormality of the first detector can be detected. Consequently, for example, the operation of the uninterruptible power supply module determined such that the first detector thereof is abnormal can be stopped when the plurality of uninterruptible power supply modules is connected to the common battery. Furthermore, for example, when the plurality of uninterruptible power supply modules is connected to batteries separate from each other, respectively, the operation of the uninterruptible power supply module determined such that the first detector thereof is abnormal can be switched from the power converter power supply control to the battery power supply control.

In this case, the first normal range is preferably set to a wider range than the second normal range. When the width of the first normal range and the width of the second normal range are the same and an error (variation) occurs between the first detection value of the first detector and the second detection value of the second detector, the first detection value is conceivably outside the first normal range, and the second detection value is conceivably within the second normal range even when no abnormality has occurred in the first detector. In this regard, according to the present invention, the first normal range is set to a wider range than the second normal range such that it is possible to more accurately determine that an abnormality has occurred in the first detector that detects the first detection value that exceeds the error range.

In the aforementioned uninterruptible power supply that determines that the first detector of the uninterruptible power supply module, the first detection value of which is outside the first normal range, is abnormal, the plurality of uninterruptible power supply modules is preferably connected to the battery that is common, and the controller is preferably configured to perform a control to stop power supply by the uninterruptible power supply module determined such that the first detector thereof is abnormal. Accordingly, the uninterruptible power supply module in which the first detector has an abnormality can be stopped, and thus even when the first detector has an abnormality, current return between the plurality of uninterruptible power supply modules via the battery can be significantly reduced or prevented.

In the aforementioned uninterruptible power supply that determines that the first detector of the uninterruptible power supply module, the first detection value of which is outside the first normal range, is abnormal, the battery preferably includes a plurality of batteries provided in the plurality of uninterruptible power supply modules, respectively, and the controller is preferably configured to perform a control to switch power supply by the uninterruptible power supply module determined such that the first detector thereof is abnormal from the power converter power supply control to the battery power supply control. Accordingly, when the battery is provided in each of the plurality of uninterruptible power supply modules and there is no possibility that current return between the plurality of uninterruptible power supply modules occurs, power supply by the uninterruptible power supply module determined such that the first detector thereof is abnormal can be continued.

In the aforementioned uninterruptible power supply including the controller, the controller is preferably configured to, when performing the power converter power supply control, perform a control to switch a control in the plurality of uninterruptible power supply modules from the power converter power supply control to the battery power supply control when the second detection value is outside the second normal range, and is preferably configured to, when performing the battery power supply control, perform a control to switch the control in the plurality of uninterruptible power supply modules from the battery power supply control to the power converter power supply control when all the first detection values of the plurality of first detectors are within a third normal range that is narrower than the second normal range. Accordingly, even when the second detection value becomes outside the second normal range and the control in the plurality of uninterruptible power supply modules is once switched from the power converter power supply control to the battery power supply control, it is possible to detect (determine) that the second detector is abnormal and switch the control to the power converter power supply control. Consequently, unnecessary consumption of the power of the battery due to the abnormality of the second detector can be significantly reduced or prevented, and thus a decrease in the amount of power stored in the battery can be significantly reduced or prevented even when an abnormality occurs in the second detector.

In the aforementioned uninterruptible power supply including the controller, the controller is preferably configured to, when performing the power converter power supply control, perform a control to switch a control in the plurality of uninterruptible power supply modules from the power converter power supply control to the battery power supply control when the second detection value is outside the second normal range and the first detection value of one of the plurality of first detectors is outside a third normal range that is narrower than the second normal range. Accordingly, unlike a case in which a control is switched based on the comparison between the second detection value and the second normal range, and then a control is switched based on the comparison between a plurality of first detection values and the third normal range, frequent switching between the battery power supply control and the power converter power supply control can be significantly reduced or prevented.

In this case, the controller is preferably configured to, when performing the power converter power supply control, perform a control to switch a control in the plurality of uninterruptible power supply modules from the power converter power supply control to the battery power supply control when the second detection value is outside the second normal range, and is preferably configured to, when performing the battery power supply control, perform a control to switch the control in the plurality of uninterruptible power supply modules from the battery power supply control to the power converter power supply control when all the first detection values of the plurality of first detectors are within the second normal range continuously for a predetermined period of time. Accordingly, unlike a case in which a control is performed to switch the battery power supply control to the power converter power supply control immediately after all the first detection values of the plurality of first detectors become within the second normal range, the predetermined period of time is provided, and thus frequent switching between the battery power supply control and the power converter power supply control can be significantly reduced or prevented.

In the aforementioned uninterruptible power supply including the plurality of uninterruptible power supply modules, the plurality of first detectors is preferably arranged in housings of the plurality of uninterruptible power supply modules, respectively, and the second detector is preferably connected to a common conductor arranged outside the housings of the plurality of uninterruptible power supply modules, the common conductor being connected to the plurality of uninterruptible power supply modules. Accordingly, the first detectors can be easily arranged in the plurality of uninterruptible power supply modules, respectively, and the second detector can be easily arranged in a common portion of the plurality of uninterruptible power supply modules.

In the aforementioned uninterruptible power supply according to this aspect, the first detector preferably detects a voltage value input to the power converter as the first detection value, and the second detector preferably detects a voltage value input to the uninterruptible power supply module as the second detection value. Accordingly, the voltage value input to the power converter is detected such that the first detection value can be easily acquired, and the voltage value input to the uninterruptible power supply module is detected such that the second detection value can be easily acquired.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a block diagram of an uninterruptible power supply according to a third modified example of the first to third embodiments.

DESCRIPTION OF THE PREFERRED EMBODIMENTS

Embodiments of the present invention are hereinafter described with reference to the drawings.

First Embodiment

The configuration of an uninterruptible power supply 100 according to a first embodiment is now described with reference to FIGS. 1 to 3.
(Overall Configuration of Uninterruptible Power Supply)

Figure 1:
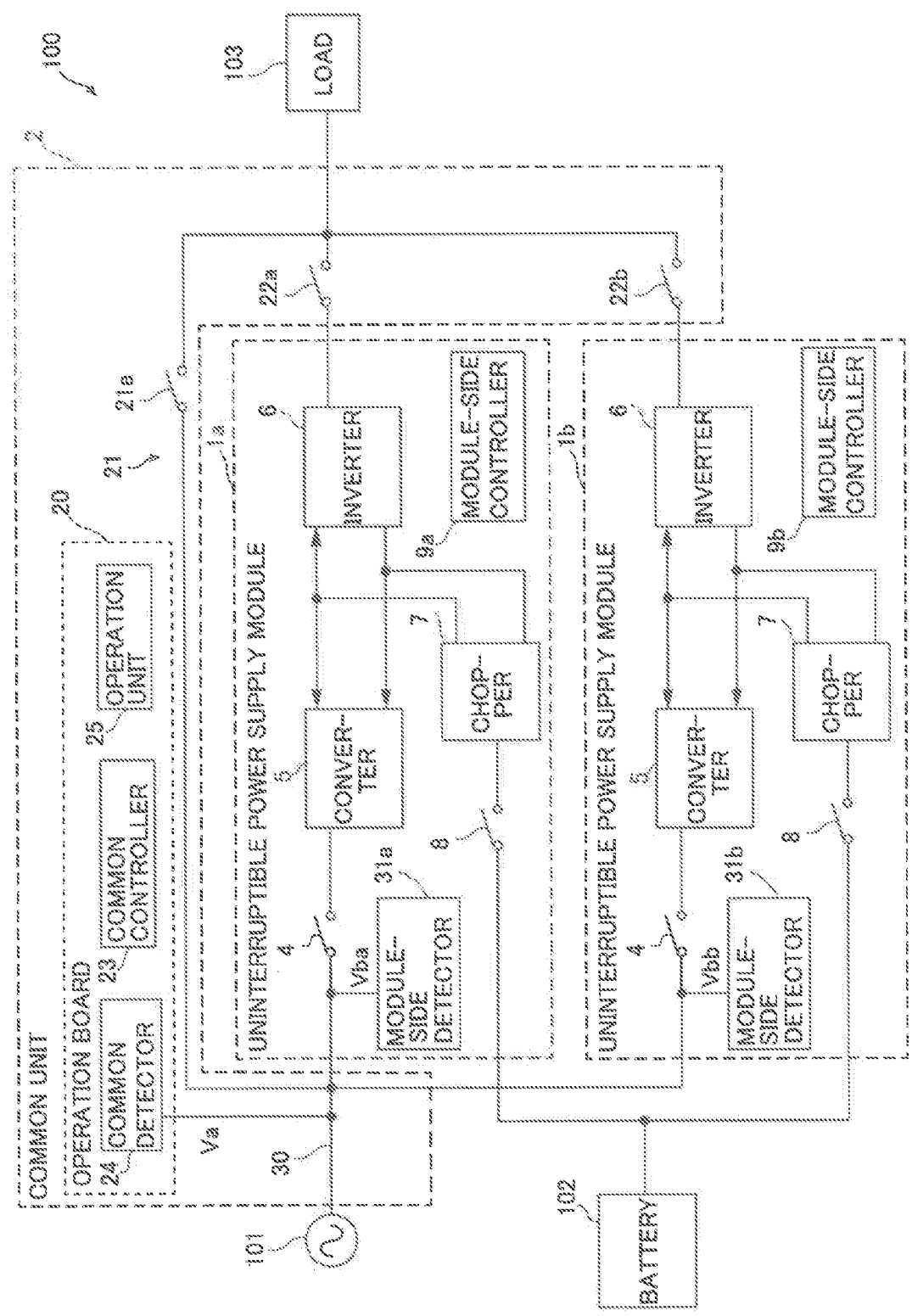
FIG. 1 is a block diagram of an uninterruptible power supply according to a first embodiment.

As shown in FIG. 1, the uninterruptible power supply 100 is an apparatus that supplies power from a battery 102 to a load 103 instead of power from an AC power supply 101 when power supply from the AC power supply 101 is stopped or the power supply is unstable. The uninterruptible power supply 100 includes uninterruptible power supply modules 1a and 1b and a common unit 2. The AC power supply 101 is a commercial power supply, for example. Furthermore, in the first embodiment, the uninterruptible power supply modules 1a and 1b are connected to the common battery 102.

The uninterruptible power supply modules 1a and 1b are connected in parallel to each other between the AC power supply 101 and the load 103. That is, the uninterruptible power supply modules 1a and 1b are connected to the common AC power supply 101. The common unit 2 includes an operation board 20, a bypass circuit 21, and disconnection switches 22a and 22b. The operation board 20 includes a common controller 23, a common detector 24, and an operation unit 25. The common controller 23 transmits a command to the uninterruptible power supply modules 1a and 1b by communication, and also transmits and receives a detection result E2 and detection results E1a and E1b described below, to and from the uninterruptible power supply modules 1a and 1b. The common controller 23 is an example of a "controller" in the claims. The common detector 24 is an example of the "second detector" in the claims.

In the bypass circuit 21, a switch 21a switches between a state in which the AC power supply 101 is connected to the load 103 and a state in which the AC power supply 101 is disconnected from the load 103, based on a command from the common controller 23 based on an operation performed on the operation unit 25. Power supply to the load 103 via the bypass circuit 21 is performed during maintenance of the uninterruptible power supply 100, for example.

The disconnection switch 22a switches between a state in which the uninterruptible power supply module 1a is connected to the load 103 and a state in which the uninterruptible power supply module 1a is disconnected from the load 103, based on a command from the common controller 23. The disconnection switch 22b switches between a state in which the uninterruptible power supply module 1b is connected to the load 103 and a state in which the uninterruptible power supply module 1b is disconnected from the load 103, based on a command from the common controller 23.

The uninterruptible power supply 100 includes a common conductor 30 on the AC power supply 101 side relative to module-side detectors 31a and 31b described below. In the first embodiment, the common detector 24 is connected to the common conductor 30. That is, the common detector 24 is provided on the input side of a converter 5, which is described below, of each of the uninterruptible power supply modules 1a and 1b. The common detector 24 detects voltage values input to the uninterruptible power supply modules 1a and 1b as a common voltage value Va. The common voltage value Va is an example of a "second detection value" in the claims. The module-side detectors 31a and 31b are examples of a "first detector" in the claims.

Figure 2:
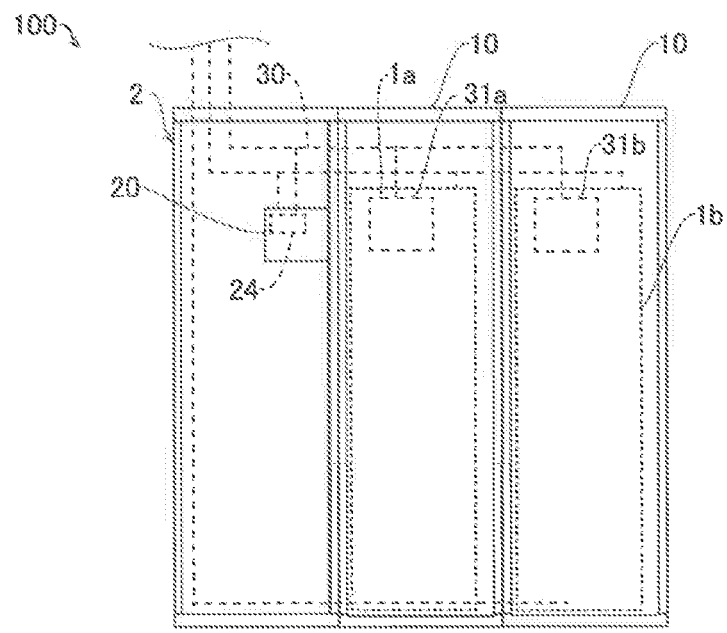
FIG. 2 is a diagram schematically showing the uninterruptible power supply according to the first embodiment.

As shown in FIG. 2, each of the uninterruptible power supply modules 1a and 1b includes a housing 10. The housing 10 of the uninterruptible power supply module 1a, the housing 10 of the uninterruptible power supply module 1b, and the operation board 20 are arranged side by side (adjacent to each other) in a right-left direction. The common conductor 30 extends from the housing 10 of the uninterruptible power supply module 1a and the housing 10 of the uninterruptible power supply module 1b to the operation board 20 outside the housings 10. The common conductor 30 is connected to each of the AC power supply 101 (see FIG. 1), the load 103, the operation board 20, and the uninterruptible power supply modules 1a and 1b.

(Configuration of Uninterruptible Power Supply Modules)

As shown in FIG. 1, each of the uninterruptible power supply modules 1a and 1b includes an input-side switch 4, the converter 5, an inverter 6, a chopper 7, and a battery connection switch 8. The uninterruptible power supply module 1a includes a module-side controller 9a. The uninterruptible power supply module 1b includes a module-side controller 9b. The input-side switch 4 is arranged between the converter 5 and the AC power supply 101. The input-side switch 4 switches between a state in which the converter 5 is connected to the AC power supply 101 and a state in which the converter 5 is disconnected from the AC power supply 101, based on a command from the module-side controller 9a (9b). The battery connection switch 8 switches between a state in which the battery 102 is connected to the chopper 7 and a state in which the battery 102 is disconnected from the chopper 7, based on a command from the module-side controller 9a (9b). The converter 5, the inverter 6, and the chopper 7 are examples of a "power converter" in the claims. The module-side controller 9a (9b) is an example of a "controller" in the claims.

The converter 5 converts AC power supplied from the AC power supply 101 into DC power and supplies the DC power to the inverter 6 and the chopper 7. Furthermore, the converter 5 performs a power conversion process based on a command from the module-side controller 9a (9b) based on a module-side voltage value Vba (Vbb) detected by the module-side detector 31a (31b) described below.

The inverter 6 is arranged on the output side relative to the converter 5 and the chopper 7. The inverter 6 converts the DC power supplied from the converter 5 or the chopper 7 into AC power, and supplies the AC power to the load 103 side (disconnection switch 22a side).

When a battery power supply control described below is performed, the chopper 7 converts DC power from the battery 102 such that the DC power has a predetermined voltage, and supplies the converted DC power to the inverter 6. When an inverter power supply control described below is performed, the chopper 7 converts power supplied from the converter 5 such that the power has a predetermined voltage, and supplies the converted DC power to the battery 102.

The module-side controller 9a (9b) controls the operation of each portion of the uninterruptible power supply module 1a (1b). For example, the module-side controller 9a (9b) performs any of the inverter power supply control, the battery power supply control, and a disconnection control.

The inverter power supply control refers to a control to convert the power from the AC power supply 101 in the converter 5 and the inverter 6 in a state in which the input-side switch 4 is turned on (conducted), and supply the converted power to the load 103 side. In the inverter power supply control, a control is also performed to convert the power from the AC power supply 101 in the converter 5 and the chopper 7 in a state in which the battery connection switch 8 is turned on (conducted), and supply the power to the battery 102 so as to charge the battery 102 (increase the amount of power stored). The inverter power supply control is an example of a "power converter power supply control" in the claims.

The battery power supply control refers to a control to convert the DC power from the battery 102 in the chopper 7 and the inverter 6 in a state in which the input-side switch 4 is turned off (disconnected) and the battery connection switch 8 is turned on (conducted), and supply the converted power to the load 103 side.

In the disconnection control, the input-side switch 4 is turned off, the battery connection switch 8 is turned off, and the disconnection switch 22a is turned off. That is, the disconnection control refers to a control to electrically disconnect the uninterruptible power supply module 1a (1b) from each of the AC power supply 101, the battery 102, and the load 103.

(Configuration of Module-Side Detector)

As shown in FIG. 2, the uninterruptible power supply 100 includes the module-side detector 31a arranged in the housing 10 of the uninterruptible power supply module 1a and the module-side detector 31b arranged in the housing 10 of the uninterruptible power supply module 1b. As shown in FIG. 1, the module-side detector 31a is arranged on the AC power supply 101 side relative to the converter 5 of the uninterruptible power supply module 1a. The module-side detector 31b is arranged on the AC power supply 101 side relative to the converter 5 of the uninterruptible power supply module 1b. For example, each of the module-side detectors 31a and 31b is arranged on the AC power supply 101 side relative to the input-side switch 4. The module-side detector 31a detects the module-side voltage value Vba of the power input to the converter 5 of the uninterruptible power supply module 1a. The module-side detector 31b detects the module-side voltage value Vbb of the power input to the converter 5 of the uninterruptible power supply module 1b.

(Configuration of Abnormality Detection and Control Switching)

Figure 3:
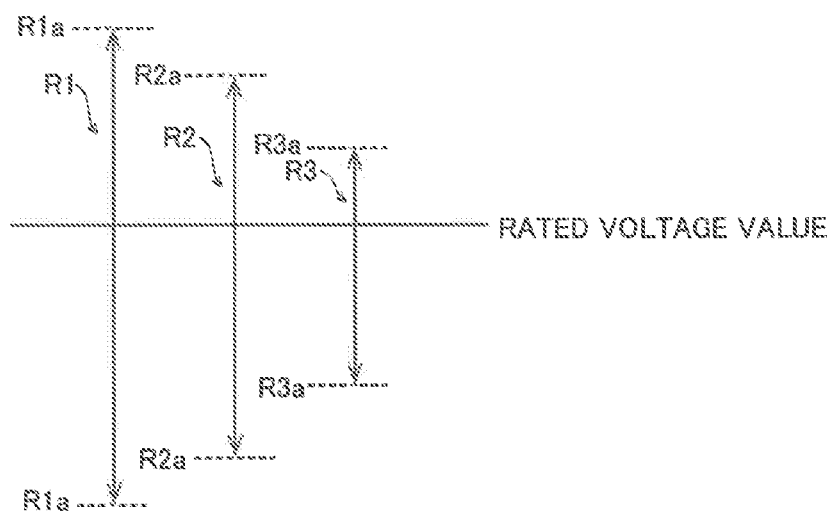
FIG. 3 is a diagram illustrating a first normal range, a second normal range, and a third normal range according to the first embodiment.

As shown in FIG. 3, the common controller 23 and the module-side controller 9a (9b) control the uninterruptible power supply module 1a (1b) to perform the inverter power supply control on the power from the AC power supply 101 when the module-side voltage value Vba (Vbb) detected by the module-side detector 31a (31b) is within a first normal range R1 and the common voltage value Va is within a second normal range R2. Furthermore, the common controller 23 and the module-side controller 9a (9b) control the uninterruptible power supply module 1a (1b) to perform the battery power supply control when the common voltage value Va is outside the second normal range R2.

Specifically, the module-side controller 9a (9b) acquires the module-side voltage value Vba (Vbb) from the module-side controller 9a (9b), and acquires the detection result E1a (E1b) as to whether or not the module-side voltage value Vba (Vbb) is within the first normal range R1. The module-side controller 9a (9b) transmits the detection result E1a (E1b) to the common controller 23.

Then, the common controller 23 acquires the common voltage value Va from the common detector 24 and acquires the detection result E2 as to whether or not the common voltage value Va is within the second normal range R2. Then, the common controller 23 transmits the detection result E2 to the module-side controller 9a (9b).

Then, the common controller 23 gives a command to the module-side controller 9a (9b) to perform the inverter power supply control when the module-side voltage value Vba (Vbb) is within the first normal range R1 and the common voltage value Va is within the second normal range R2 based on the detection result E1a (E1b). Thus, the inverter power supply control is performed in the uninterruptible power supply module 1a (1b).

When the common voltage value Va is outside the second normal range R2, the common controller 23 gives a command to the uninterruptible power supply module 1a (1b) to perform the battery power supply control. Thus, the battery power supply control is performed in the uninterruptible power supply module 1a (1b).

<Detection of Abnormality of Module-Side Detector>

While the inverter power supply control is being performed, when the common voltage value Va is within the second normal range R2, the common controller 23 performs a control to determine that the module-side detector 31a (31b) of the uninterruptible power supply module 1a (1b), the module-side voltage value Vba or Vbb of which is outside the first normal range R1, is abnormal.

As shown in FIG. 3, in the first embodiment, the first normal range R1 is set to a wider range than the second normal range R2. That is, the upper limit value R1a of the first normal range R1 is higher than the upper limit value R2a of the second normal range R2, and the lower limit value R1b of the first normal range R1 is lower than the lower limit value R2b of the second normal range R2. For example, the first normal range R1 is wider than the second normal range R2, the lower limit value of the first normal range R1 is −35% of the rated voltage value, and the upper limit value of the first normal range R1 is +20% of the rated voltage value. The second normal range R2 is narrower than the first normal range R1, the lower limit value of the second normal range R2 is −30% of the rated voltage value, and the upper limit value of the second normal range R2 is +15% of the rated voltage value. The first normal range R1 and the second normal range R2 are not limited to the above examples. The lower limit value of the first normal range R1 may be −15% of the rated voltage value, and the upper limit value of the first normal range R1 may be +15% of the rated voltage value. The lower limit value of the second normal range R2 may be −10% of the rated voltage value, and the upper limit value of the second normal range R2 may be +15% of the rated voltage value. Furthermore, the detection errors (variations) of the common detector 24 and the module-side detectors 31a and 31b are ±1% of the rated voltage value, for example. That is, the first normal range R1 is wider than a range obtained by adding a detection error (variation) range to the second normal range R2. As long as the first normal range R1 and the second normal range R2 are determined as described above, the common detector 24 always detects the abnormality of an input voltage first when the input voltage fluctuates. Therefore, when only the abnormality of the voltage of the module-side detector 31a (31b) is detected, it can be considered that an abnormality does not occur in the input voltage but occurs in a circuit itself of the module-side detector 31a (31b).

For example, the common controller 23 performs a control to determine that the module-side detector 31a of the uninterruptible power supply module 1a is abnormal when the common voltage value Va is within the second normal range R2 and the detection result E1a acquired from the uninterruptible power supply module 1a is outside the first normal range R1. Then, the common controller 23 performs a control to stop power supply by the uninterruptible power supply module 1a determined such that the module-side detector 31a thereof is abnormal. That is, the common controller 23 and the module-side controller 9a perform the disconnection control. Specifically, the common controller 23 disconnects the disconnection switch 22a, and the module-side controller 9a disconnects the input-side switch 4 and the battery connection switch 8. Thus, when the detection result E1b is within the first normal range R1, the uninterruptible power supply module 1b can continue power supply. That is, the inverter power supply control can be performed while the uninterruptible power supply module 1b, the detected voltage value of which is normal, maintains the charge of the battery 102.

<Detection of Abnormality of Common Detector>

When the battery power supply control is performed, the common controller 23 (module-side controllers 9a and 9b) performs a control to determine that the common detector 24 is abnormal when both the module-side voltage values Vba and Vbb of the module-side detectors 31a and 31b are within a third normal range R3 that is narrower than the second normal range R2. Then, the module-side controllers 9a and 9b perform a control to switch a control in the uninterruptible power supply modules 1a and 1b from the battery power supply control to the inverter power supply control. As shown in FIG. 3, the upper limit value Ria of the third normal range R3 is lower than the upper limit value R2a of the second normal range R2, and the lower limit value R3b of the third normal range R3 is higher than the lower limit value R2b of the second normal range R2.

Specifically, the module-side controllers 9a and 9b perform a control to determine that the common detector 24 is abnormal when the detection result E2 indicates that the common voltage value Va is outside the second normal range R2, and the module-side voltage values Vba and Vbb are within the third normal range R3. In this case, the module-side controllers 9a and 9b perform a control to switch a control in the uninterruptible power supply modules 1a and 1b from the battery power supply control to the inverter power supply control.

The module-side controllers 9a and 9b do not change a control in the uninterruptible power supply modules 1a and 1b from the battery power supply control when the module-side voltage values Vba and Vbb are outside the third normal range R3.

(Control Process of Uninterruptible Power Supply According to First Embodiment)

Figure 4:
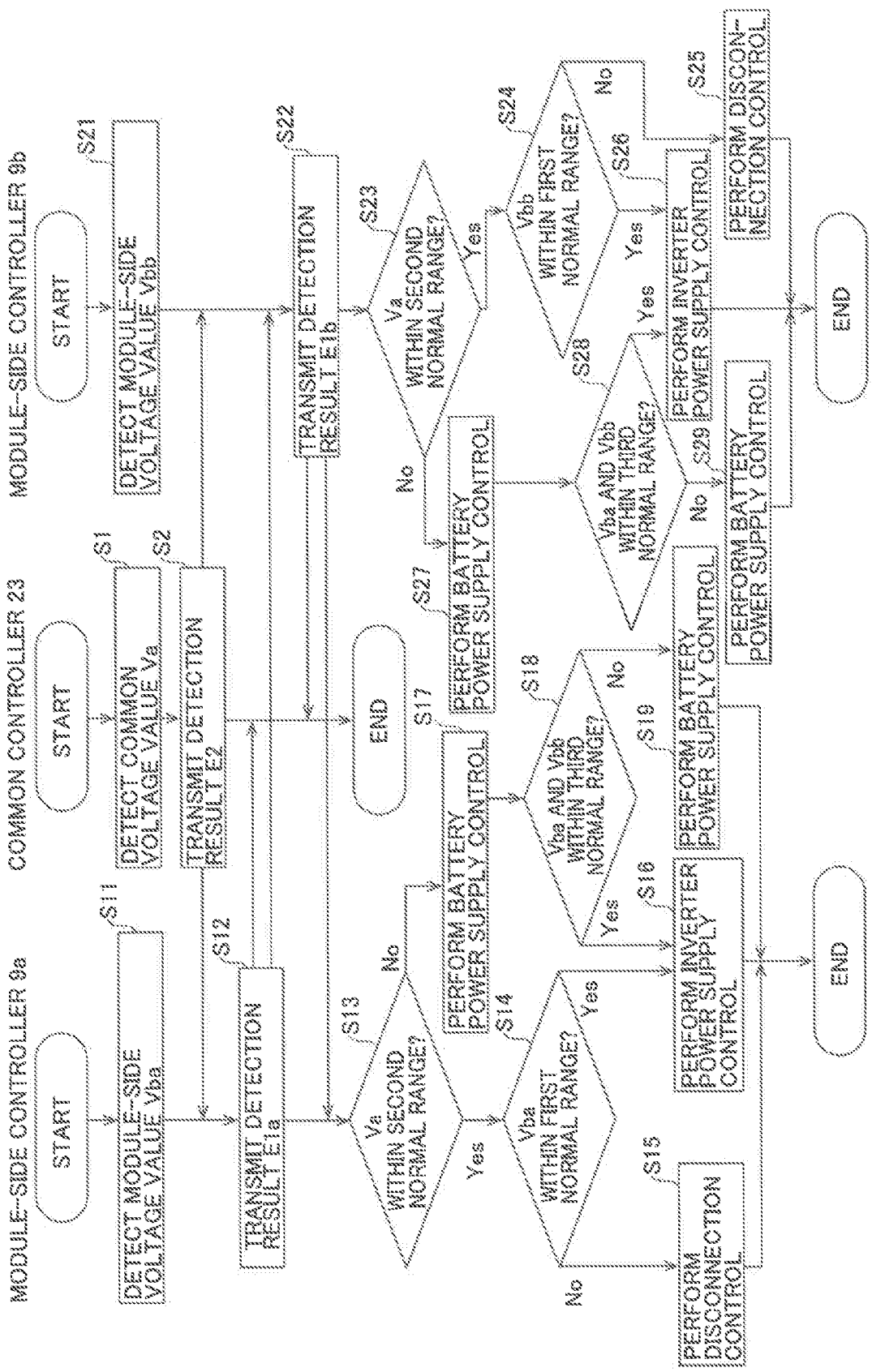
FIG. 4 is a flowchart for illustrating a control process of the uninterruptible power supply according to the first embodiment.

A control process of the uninterruptible power supply 100 according to the first embodiment is now described with reference to FIG. 4. In the control process of the uninterruptible power supply 100, step S1 and step S2 are performed by the common controller 23, step S11 to step S19 are performed by the module-side controller 9a, and step S21 to step S29 are performed by the module-side controller 9b.

In step S1, the common voltage value Va is detected by the common detector 24. Then, in step S2, the detection result E2 is transmitted from the common controller 23 to the module-side controllers 9a and 9b.

In step S11, the module-side voltage value Vba is detected by the module-side detector 31a. Then, in step S12, the detection result E1a is transmitted from the module-side controller 9a to the common controller 23 and the module-side controller 9b. Then, the process advances to step S13.

In step S13, it is determined whether or not the common voltage value Va is within the second normal range R2. When the common voltage value Va is within the second normal range R2, the process advances to step S14, and when the common voltage value Va is not within the second normal range R2 (outside the range), the process advances to step S17.

In step S14, it is determined whether or not the module-side voltage value Vba is within the first normal range R1. When the module-side voltage value Vba is within the first normal range R1, the process advances to step S16, and when the module-side voltage value Vba is not within the first normal range R1 (outside the range), the process advances to step S15.

In step S15, the disconnection control is performed in the uninterruptible power supply module 1a. That is, the operation of the uninterruptible power supply module 1a is stopped, and the input-side switch 4, the battery connection switch 8, and the disconnection switch 22a are turned off (disconnected).

In step S16, the inverter power supply control is performed by the uninterruptible power supply module 1a.

In step S17, the battery power supply control is performed by the uninterruptible power supply module 1a. Also in step S27 described below, the battery power supply control is performed by the uninterruptible power supply module 1b. Therefore, the battery power supply control is performed by the uninterruptible power supply modules 1a and 1b. Then, the process advances to step S18.

In step S18, it is determined whether or not the module-side voltage values Vba and Vbb are both within the third normal range R3. When both the module-side voltage values Vba and Vbb are within the third normal range R3, the process advances to step S16, and when either the module-side voltage values Vba or Vbb is not within the third normal range R3, the process advances to step S19.

In step S19, the battery power supply control is performed by the uninterruptible power supply modules 1a and 1b.

In step S21, the module-side voltage value Vbb is detected by the module-side detector 31b. Then, in step S22, the detection result E1b is transmitted from the module-side controller 9b to the common controller 23 and the module-side controller 9a. Then, the process advances to step S23.

In step S23, it is determined whether or not the common voltage value Va is within the second normal range R2. When the common voltage value Va is within the second normal range R2, the process advances to step S24, and when the common voltage value Va is not within the second normal range R2 (outside the range), the process advances to step S27.

In step S24, it is determined whether or not the module-side voltage value Vbb is within the first normal range R1. When the module-side voltage value Vbb is within the first normal range R1, the process advances to step S26, and when the module-side voltage value Vbb is not within the first normal range R1 (outside the range), the process advances to step S25.

In step S25, the disconnection control is performed in the uninterruptible power supply module 1b. That is, the operation of the uninterruptible power supply module 1b is stopped, and the input-side switch 4, the battery connection switch 8, and the disconnection switch 22b are turned off (disconnected).

In step S26, the inverter power supply control is performed by the uninterruptible power supply module 1b.

In step S27, the battery power supply control is performed by the uninterruptible power supply module 1b. Also in step S17 described above, the battery power supply control is performed by the uninterruptible power supply module 1a. Therefore, the battery power supply control is performed by the uninterruptible power supply modules 1a and 1b. Then, the process advances to step S28.

In step S28, it is determined whether or not the module-side voltage values Vba and Vbb are both within the third normal range R3. When both the module-side voltage values Vba and Vbb are within the third normal range R3, the process advances to step S26, and when either the module-side voltage values Vba or Vbb is not within the third normal range R3, the process advances to step S29.

In step S29, the battery power supply control is performed by the uninterruptible power supply modules 1a and 1b.

Advantageous Effects of First Embodiment

According to the first embodiment, the following advantageous effects are achieved.

According to the first embodiment, as described above, the uninterruptible power supply 100 includes the common detector 24 that is provided on the AC power supply 101 side relative to the module-side detector 31a (31b) and detects the common voltage value Va, which is a voltage value input to the uninterruptible power supply module 1a (1b). Accordingly, when only one of the module-side voltage value Vba (Vbab) of the module-side detector 31a (31b) and the common voltage value Va of the common detector 24 is an abnormal value, it can be presumed that an abnormality (a failure in the detector itself) has occurred in the detector itself that detects an abnormal value. When both the module-side voltage value Vba (Vbab) of the module-side detector 31a (31b) and the common voltage value Va of the common detector 24 are abnormal values, it can be presumed by the module-side detector 31a (31b) and the common detector 24 that the module-side detector 31a (31b) and the common detector 24 itself are normal, but an abnormality (a power failure) has occurred in the power from the AC power supply 101. Therefore, when one of the module-side detector 31a (31b) and the common detector 24 detects an abnormal value (a value outside the normal range), the operation of the converter 5, for example, of the uninterruptible power supply module 1a (1b) can be continued based on a detection value of the other of the module-side detector 31a (31b) and the common detector 24 indicating a normal value. Consequently, even when an abnormality occurs in either the module-side detector 31a (31b) or the common detector 24, power supply to the load 103 side can be continued without using the power stored in the battery 102 as long as the power from the AC power supply 101 is supplied (unless there is a power failure). Thus, even when an abnormality occurs in the detector (either the module-side detector 31a (31b) or the common detector 24), a decrease in the amount of power stored in the battery 102 can be significantly reduced or prevented.

According to the first embodiment, as described above, the common AC power supply 101 is connected to the uninterruptible power supply modules 1a and 1b. Furthermore, the module-side detectors 31a and 31b are provided on the input sides of the converters 5 of the uninterruptible power supply modules 1a and 1b, respectively. Moreover, the common detector 24 detects the common voltage value Va in the common AC power supply 101. Accordingly, the common detector 24 can be shared with the uninterruptible power supply modules 1a and 1b, and thus an increase in the number of components of the uninterruptible power supply 100 can be effectively significantly reduced or prevented even when the common detector 24 is provided.

According to the first embodiment, as described above, the common controller 23 and the module-side controllers 9a and 9b perform the inverter power supply control to supply the power from the AC power supply 101 to the load 103 side via the converters 5, for example, of the uninterruptible power supply modules 1a and 1b when the module-side voltage values Vba and Vbb detected by the module-side detectors 31a and 31b are within the first normal range R1 and the common voltage value Va is within the second normal range R2, and performs the battery power supply control to control the uninterruptible power supply modules 1a and 1b to supply the power from the battery 102 to the load 103 side when the common voltage value Va is outside the second normal range R2. Accordingly, it is possible to switch between the inverter power supply control performed by all of the plurality of uninterruptible power supply modules 1a and 1b and the battery power supply control performed by all of the plurality of uninterruptible power supply modules 1a and 1b, and thus mixing of the uninterruptible power supply module that performs the inverter power supply control with the uninterruptible power supply module that performs the battery power supply control can be significantly reduced or prevented. Consequently, even when the uninterruptible power supply modules 1a and 1b are connected to the common battery 102, current return between the uninterruptible power supply modules 1a and 1b via the battery 102 can be significantly reduced or prevented. When the uninterruptible power supply module 1a (1b) that performs the battery power supply control is mixed with the uninterruptible power supply module 1b (1a) that performs the inverter power supply control, the battery 102 cannot be charged, and the choppers 7 of the uninterruptible power supply modules 1a and 1b operate in different modes. Thus, an excessive current may flow between the choppers 7, and it is not preferable for the stability of a system of the uninterruptible power supply 100. Therefore, it is desirable to prevent continuation of the operation in a mixed state.

According to the first embodiment, as described above, the common controller 23 and the module-side controllers 9a and 9b are configured to, when performing the inverter power supply control, perform a control to determine that the module-side detector 31a (31b) of the uninterruptible power supply module 1a (1b), the module-side voltage value Vba (Vbb) of which is outside the first normal range R1, is abnormal when the common voltage value Va is within the second normal range R2. Accordingly, the abnormality of the module-side detector 31a (31b) can be detected. Consequently, the operation of the uninterruptible power supply module 1a (1b) determined such that the module-side detector 31a (31b) thereof is abnormal can be stopped.

According to the first embodiment, as described above, the first normal range R1 is set to a wider range than the second normal range R2. Accordingly, it is possible to more accurately determine that an abnormality has occurred in the module-side detector 31a (31b) that detects the module-side voltage value Vba (Vbb) that exceeds the error range.

According to the first embodiment, as described above, the uninterruptible power supply modules 1a and 1b are connected to the common battery 102. Furthermore, the common controller 23 and the module-side controllers 9a and 9b perform a control to stop power supply by the uninterruptible power supply module 1a (1b) determined such that the module-side detector 31a (31b) thereof is abnormal. Accordingly, the uninterruptible power supply module 1a (1b) in which the module-side detector 31a (31b) has an abnormality can be stopped, and thus even when the module-side detector 31a (31b) has an abnormality, current return between the uninterruptible power supply modules 1a and 1b via the battery 102 can be significantly reduced or prevented.

According to the first embodiment, as described above, the common controller 23 and the module-side controllers 9a and 9b are configured to, when performing the inverter power supply control, switch a control in the uninterruptible power supply modules 1a and 1b from the inverter power supply control to the battery power supply control when the common voltage value Va is outside the second normal range R2. Furthermore, the common controller 23 and the module-side controllers 9a and 9b are configured to, when performing the battery power supply control, perform a control to switch a control in the uninterruptible power supply modules 1a and 1b from the battery power supply control to the inverter power supply control when the module-side voltage values Vba and Vbb of the module-side detectors 31a and 31b are within the third normal range R3, which is narrower than the second normal range R2. Accordingly, even when the common voltage value Va becomes outside the second normal range R2 and the control in the uninterruptible power supply modules 1a and 1b is once switched from the inverter power supply control to the battery power supply control, it is possible to detect (determine) that the common detector 24 is abnormal and switch the control to the inverter power supply control. Consequently, unnecessary consumption of the power of the battery 102 due to the abnormality of the common detector 24 can be significantly reduced or prevented, and thus a decrease in the amount of power stored in the battery 102 can be significantly reduced or prevented even when an abnormality occurs in the common detector 24.

According to the first embodiment, as described above, the module-side detectors 31a and 31b are arranged in the housings 10 of the uninterruptible power supply modules 1a and 1b, respectively. Furthermore, the common detector 24 is connected to the common conductor 30 arranged outside the housings 10 of the uninterruptible power supply modules 1a and 1b and connected to the uninterruptible power supply modules 1a and 1b. Accordingly, the module-side detectors 31a and 31b can be easily arranged in the uninterruptible power supply modules 1a and 1b, respectively, and the common detector 24 can be easily arranged in the common unit 2 of the uninterruptible power supply modules 1a and 1b.

According to the first embodiment, as described above, the module-side detector 31a (31b) detects the voltage value input to the converter 5, for example, as the module-side voltage value Vba (Vbb). Furthermore, the common detector 24 detects the voltage values input to the uninterruptible power supply modules 1a and 1b as the common voltage value Va. Accordingly, the voltage value input to the converter 5, for example, is detected such that the module-side voltage value Vba (Vbb) can be easily acquired, and the voltage values input to the uninterruptible power supply modules 1a and 1b are detected such that the common voltage value Va can be easily acquired.

Second Embodiment

The configuration of an uninterruptible power supply 200 according to a second embodiment is now described with reference to FIG. 5. In the second embodiment, a battery 302 is provided for each of uninterruptible power supply modules 201a and 201b, unlike the uninterruptible power supply 100 according to the first embodiment in which the common battery 102 is provided for the uninterruptible power supply modules 1a and 1b. The same or similar configurations as those of the first embodiment are denoted by the same reference numerals, and description thereof is omitted.

(Configuration of Uninterruptible Power Supply According to Second Embodiment)

Figure 5:
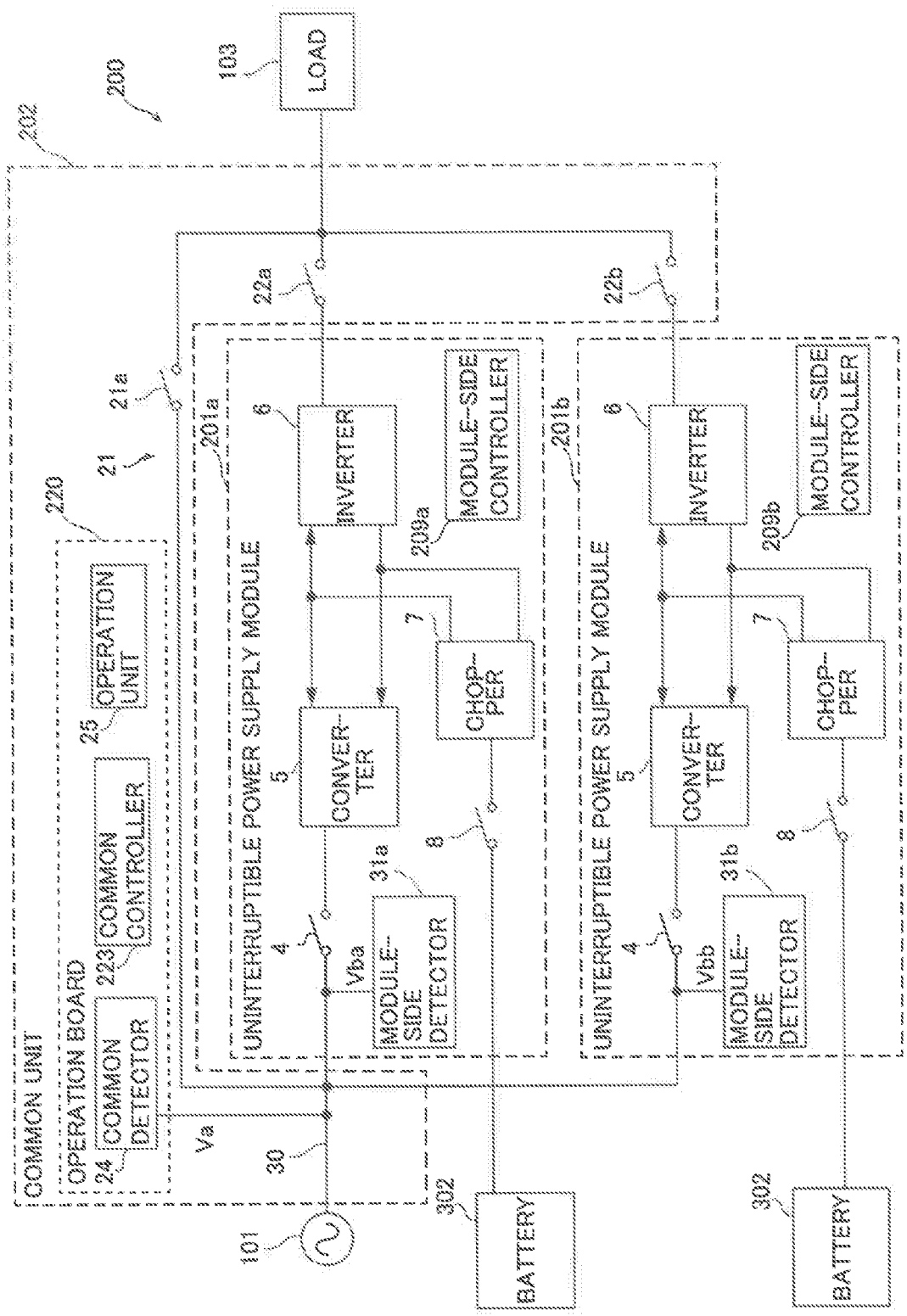
FIG. 5 is a block diagram of an uninterruptible power supply according to a second embodiment.

As shown in FIG. 5, the uninterruptible power supply 200 includes the uninterruptible power supply modules 201a and 201b, a common unit 202, and a plurality of batteries 302. The uninterruptible power supply module 201a includes a module-side controller 209a. The uninterruptible power supply module 201b includes a module-side controller 209b. The common unit 202 includes an operation board 220. The operation board 220 includes a common controller 223.

The uninterruptible power supply modules 201a and 201b are connected to the plurality of batteries 302 that is separate from each other. The common controller 223 and the module-side controllers 209a and 209b perform a control to switch power supply by the uninterruptible power supply module 201a or 201b determined such that a module-side detector 31a or 31b thereof is abnormal from an inverter power supply control to a battery power supply control. That is, in the second embodiment, there is no possibility that current return occurs via the batteries 302, and thus the battery power supply control is performed instead of a discontinuity control in the first embodiment. The remaining configurations of the second embodiment are similar to those of the first embodiment.

(Control Process of Uninterruptible Power Supply According to Second Embodiment)

Figure 6:
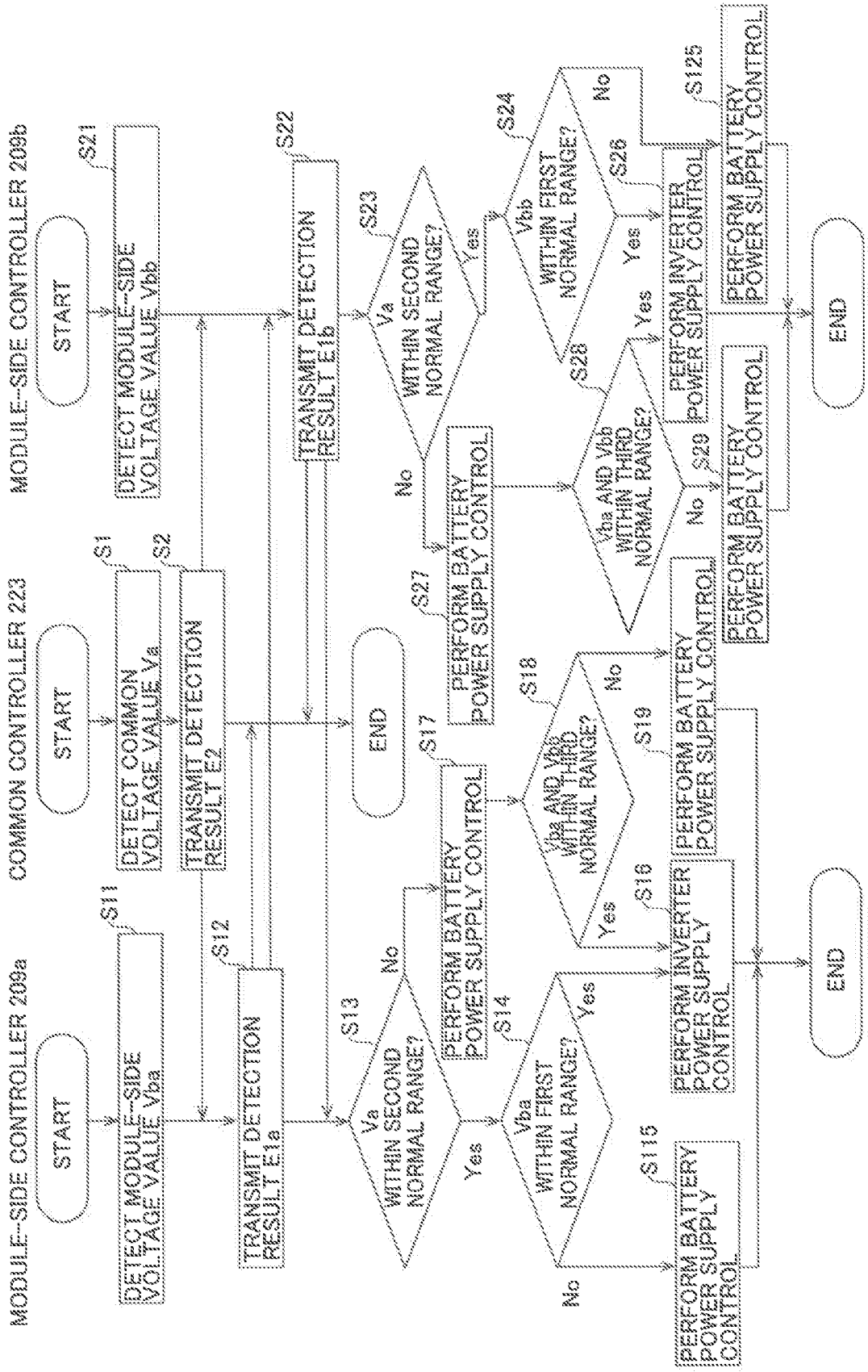
FIG. 6 is a flowchart for illustrating a control process of the uninterruptible power supply according to the second embodiment.

A control process of the uninterruptible power supply 200 according to the second embodiment is now described with reference to FIG. 6. In the control process of the uninterruptible power supply 200, step S1 and step S2 are performed by the common controller 223, step S11 to step S14, step S16 to step S19, and step S115 are performed by the module-side controller 209a, and step S21 to step S24, step S26 to step S29, and step S125 are performed by the module-side controller 209b. The same or similar process steps as those of the first embodiment are denoted by the same reference numerals (step numbers), and description thereof is omitted.

In step S115, a control is performed to switch power supply by the uninterruptible power supply module 201a determined such that the module-side detector 31a thereof is abnormal from the inverter power supply control to the battery power supply control.

In step S125, a control is performed to switch power supply by the uninterruptible power supply module 201b determined such that the module-side detector 31b thereof is abnormal from the inverter power supply control to the battery power supply control. The remaining control process steps of the second embodiment are similar to those of the first embodiment.

Advantageous Effects of Second Embodiment

According to the second embodiment, the following advantageous effects are achieved.

According to the second embodiment, as described above, the battery 302 is provided in each of the uninterruptible power supply modules 1a and 1b. Furthermore, the common controller 223 and the module-side controllers 209a and 209b perform a control to switch power supply by the uninterruptible power supply module 201a (201b) determined such that the module-side detector 31a (31b) thereof is abnormal from the inverter power supply control to the battery power supply control. Accordingly, when the battery 302 is provided in each of the uninterruptible power supply modules 201a and 201b and there is no possibility that current return between the uninterruptible power supply modules 201a and 201b occurs, power supply by the uninterruptible power supply module 201a (201b) determined such that the module-side detector 31a (31b) thereof is abnormal can be continued. The remaining advantageous effects of the second embodiment are similar to those of the first embodiment.

Third Embodiment

The configuration of an uninterruptible power supply 400 according to a third embodiment is now described with reference to FIG. 7. In the third embodiment, a control is performed to switch a control in uninterruptible power supply modules 401a and 401b from a battery power supply control to an inverter power supply control when the battery power supply control is performed and both module-side voltage values Vba and Vbb of module-side detectors 31a and 31b are within a second normal range R2 continuously for a period of time T1, unlike the uninterruptible power supply 100 according to the first embodiment in which a control is performed to switch a control in the uninterruptible power supply modules 1a and 1b from the battery power supply control to the inverter power supply control when the battery power supply control is performed and both the module-side voltage values Vba and Vbb of the module-side detectors 31a and 31b are within the third normal range R3. The same or similar configurations as those of the first and second embodiments are denoted by the same reference numerals, and description thereof is omitted.

(Configuration of Uninterruptible Power Supply According to Third Embodiment)

Figure 7:
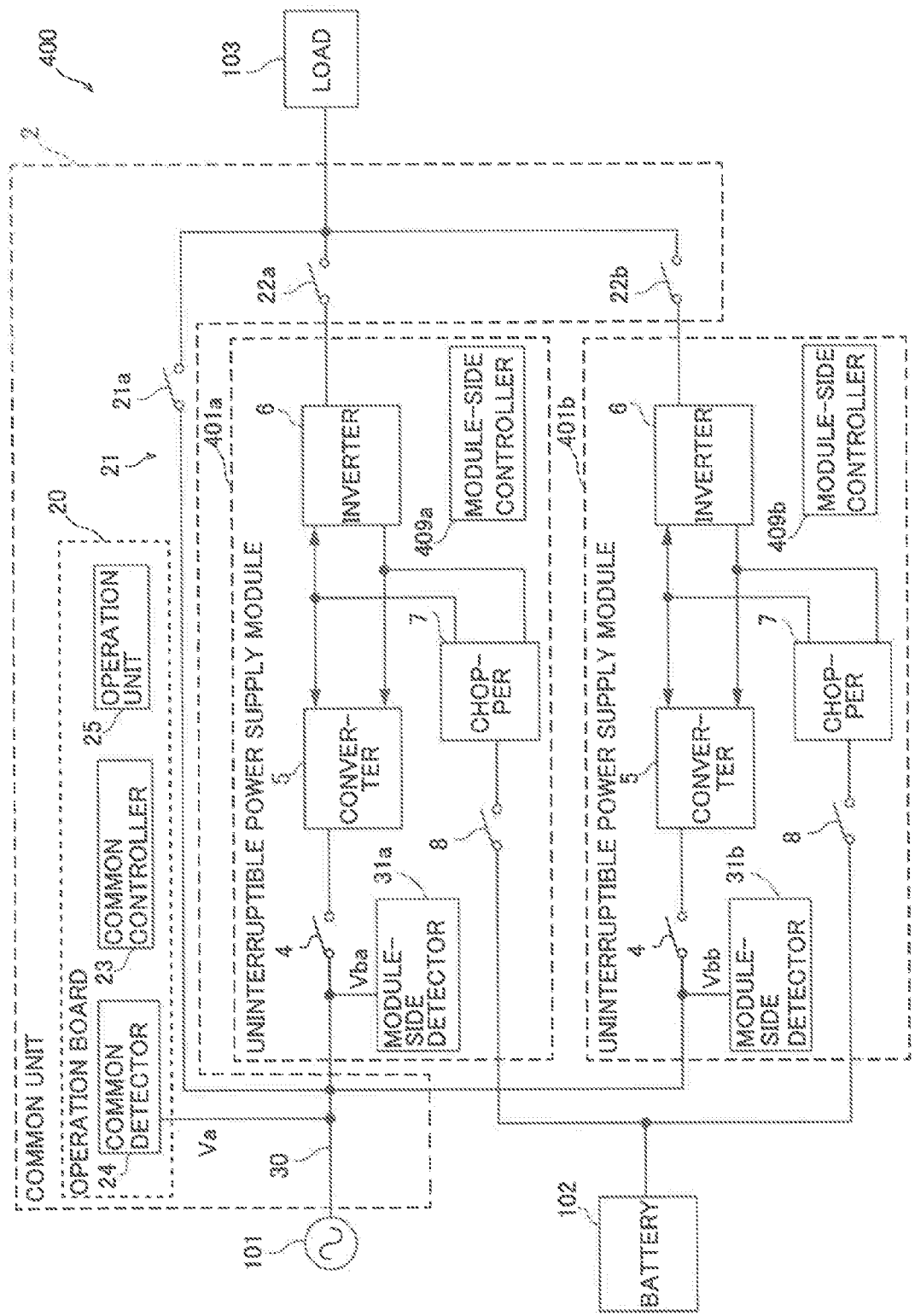
FIG. 7 is a block diagram of an uninterruptible power supply according to a third embodiment.

As shown in FIG. 7, the uninterruptible power supply 400 includes the uninterruptible power supply modules 401a and 401b. The uninterruptible power supply module 401a includes a module-side controller 409a. The uninterruptible power supply module 401b includes a module-side controller 409b.

The module-side controller 409a (409b) is configured to, when performing the battery power supply control, perform a control to switch a control in the uninterruptible power supply modules 401a and 401b from the battery power supply control to the inverter power supply control when both the module-side voltage values Vba and Vbb of the module-side detectors 31a and 31b are within the second normal range R2 continuously for the period of time T1. The remaining configurations of the third embodiment are similar to those of the first embodiment.

(Control Process of Uninterruptible Power Supply According to Third Embodiment)

Figure 8:
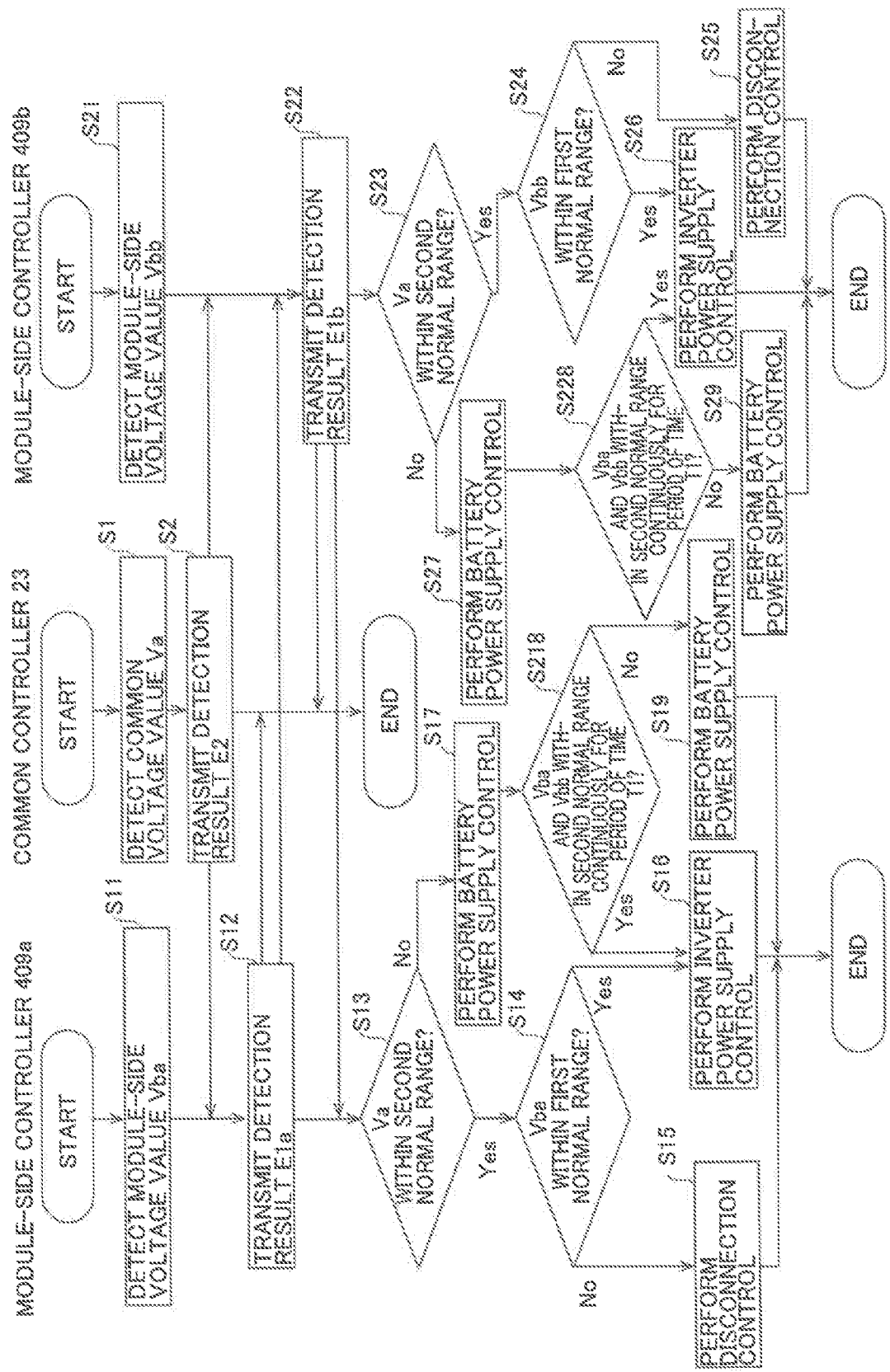
FIG. 8 is a flowchart for illustrating a control process of the uninterruptible power supply according to the third embodiment.

A control process of the uninterruptible power supply 400 according to the third embodiment is now described with reference to FIG. 8. In the control process of the uninterruptible power supply 400, step S11 to step S17, step S19, and step S218 are performed by the module-side controller 409a, and step S21 to step S27, step S29, and step S228 are performed by the module-side controller 409b. The same or similar process steps as those of the first embodiment are denoted by the same reference numerals (step numbers), and description thereof is omitted.

In step S218, it is determined whether or not the module-side voltage values Vba and Vbb are both within the second normal range R2 continuously for the period of time T1. When the module-side voltage values Vba and Vbb are both within the second normal range R2 continuously for the period of time T1, the process advances to step S16, and when either the module-side voltage value Vba or Vbb is no longer within the second normal range R2 (becomes outside the range) during the period of time T1, the process advances to step S19.

In step S228, it is determined whether or not the module-side voltage values Vba and Vbb are both within the second normal range R2 continuously for the period of time T1. When the module-side voltage values Vba and Vbb are both within the second normal range R2 continuously for the period of time T1, the process advances to step S26, and when either the module-side voltage value Vba or Vbb is no longer within the second normal range R2 (becomes outside the range) during the period of time T1, the process advances to step S29. The remaining control process steps of the third embodiment are similar to those of the first embodiment.

Advantageous Effects of Third Embodiment

According to the third embodiment, the following advantageous effects are achieved.

According to the third embodiment, as described above, the module-side controllers 409a and 409b are configured to, when performing the battery power supply control, perform a control to switch a control in the uninterruptible power supply modules 401a and 401b from the battery power supply control to the inverter power supply control when both the module-side voltage values Vba and Vbb of the module-side detectors 31a and 31b are within the second normal range R2 continuously for the period of time T1. Accordingly, unlike a case in which a control is performed to switch the battery power supply control to the inverter power supply control immediately after both the module-side voltage values Vba and Vbb of the module-side detectors 31a and 31b become within the second normal range R2, the period of time T1 is provided, and thus frequent switching between the battery power supply control and the inverter power supply control can be significantly reduced or prevented. The remaining advantageous effects of the third embodiment are similar to those of the first embodiment.

Modified Examples

The embodiments disclosed this time must be considered as illustrative in all points and not restrictive. The scope of the present invention is not shown by the above description of the embodiments but is limited by the scope of claims for patent, and all modifications (modified examples) within the meaning and scope equivalent to the scope of claims for patent are further included.

For example, while the two uninterruptible power supply modules are provided in the uninterruptible power supply in each of the aforementioned first to third embodiments, the present invention is not restricted to this. That is, in the uninterruptible power supply, only one uninterruptible power supply module may alternatively be provided, or three or more uninterruptible power supply modules may alternatively be provided.

While the common detector is provided on the operation board in each of the aforementioned first to third embodiments, the present invention is not restricted to this. That is, the common detector may alternatively be provided in the housings of the uninterruptible power supply modules.

While the first normal range is set to a wider range than the second normal range in each of the aforementioned first to third embodiments, the present invention is not restricted to this. That is, the first normal range may alternatively be set to the same range as the second normal range or a narrower range than the second normal range.

While the uninterruptible power supply module determined such that the module-side detector thereof is abnormal is disconnected when the module-side detector is determined to be abnormal in each of the aforementioned first and third embodiments, the present invention is not restricted to this. That is, the operation may alternatively be simply stopped without disconnecting the uninterruptible power supply module, or the operation may alternatively be continued using a module-side voltage value detected by a module-side detector of another uninterruptible power supply module.

While the uninterruptible power supply module determined such that the module-side detector thereof is abnormal performs the battery power supply control when the module-side detector is determined to be abnormal in the aforementioned second embodiment, the present invention is not restricted to this. That is, also in the second embodiment, the uninterruptible power supply module may alternatively be disconnected, or the inverter power supply control may alternatively be continued using a module-side voltage value detected by a module-side detector of another uninterruptible power supply module.

Figure 9:
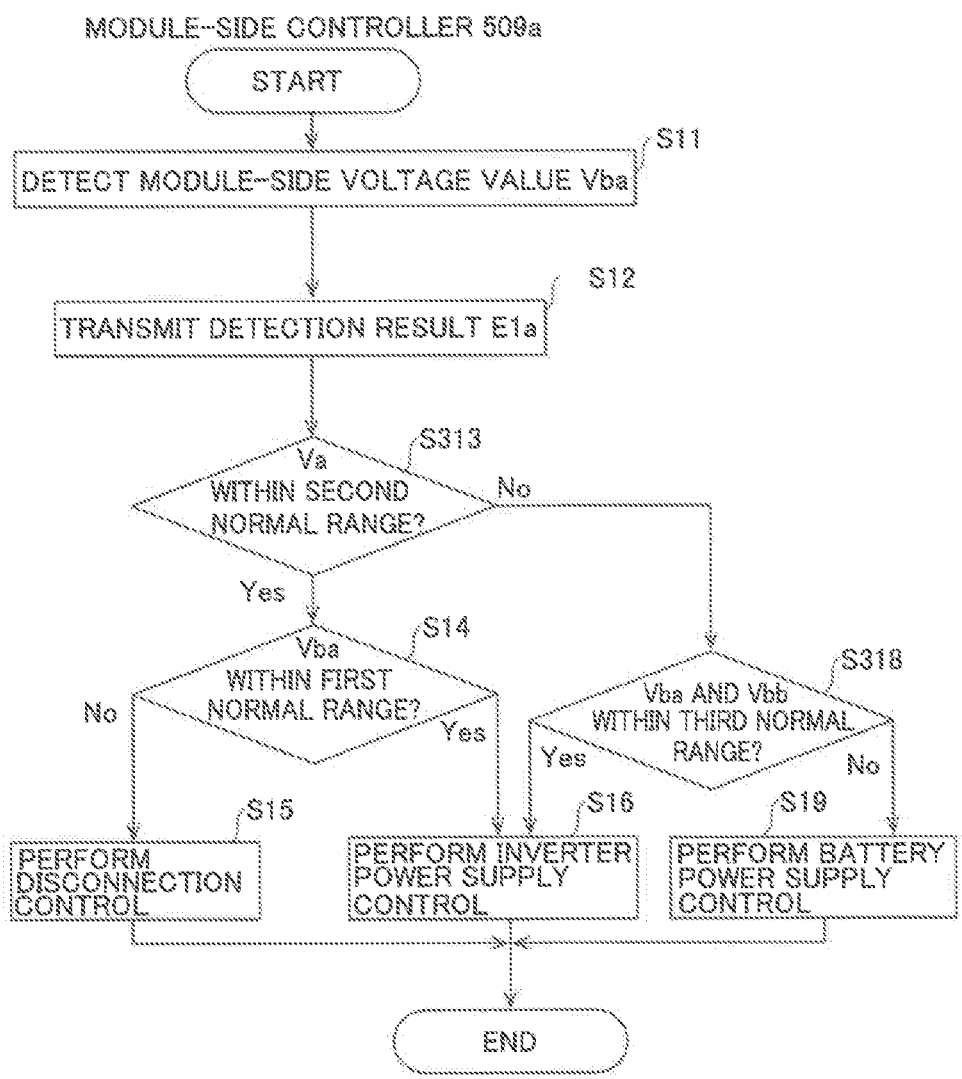
FIG. 9 is a flowchart for illustrating a control process of an uninterruptible power supply according to a first modified example of the first and third embodiments.
Figure 10:
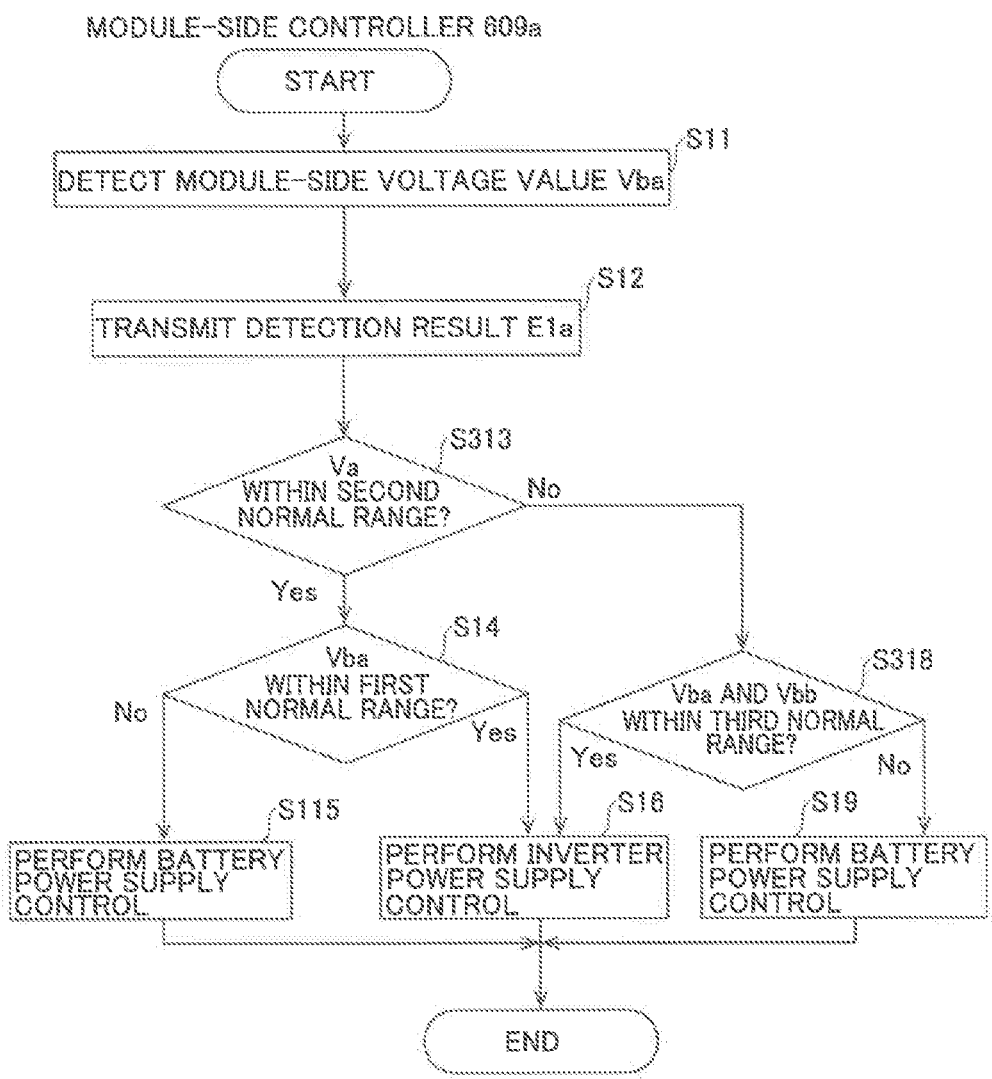
FIG. 10 is a flowchart for illustrating a control process of an uninterruptible power supply according to a second modified example of the second embodiment.

While the inverter power supply control is switched to the battery power supply control when the common voltage value Va becomes outside the second normal range R2 in each of the aforementioned first to third embodiments, the present invention is not restricted to this. For example, as in a module-side controller 509a of an uninterruptible power supply according to a first modified example shown in FIG. 9 and a module-side controller 609a of an uninterruptible power supply according to a second modified example shown in FIG. 10, even when a common voltage value Va is outside a second normal range R2 in step S313, an inverter power supply control may be continued without switching to a battery power supply control when both module-side voltage values Vba and Vbb of module-side detectors 31a and 31b are with a third normal range R3 that is narrower than the second normal range R2 in step S318. Accordingly, unlike a case in which a control is switched based on the comparison between the common voltage value Va and the second normal range R2, and then a control is switched based on the comparison between a plurality of module-side voltage values and the third normal range, frequent switching between the battery power supply control and the inverter power supply control can be significantly reduced or prevented. Alternatively, when the control of the first modified example (second modified example) and the control of the first to third embodiments are combined, and both the module-side voltage values Vba and Vbb of the module-side detectors 31a and 31b are within the second normal range R2 continuously for a period of time T1 or both the module-side voltage values Vba and Vbb of the module-side detectors 31a and 31b are within the third normal range R3, a control in uninterruptible power supply modules may be switched from the battery power supply control to the inverter power supply control. In this control, it is possible to improve the return responsiveness from the battery power supply control to the inverter power supply control while preventing frequent control switching. Alternatively, when both the module-side voltage values Vba and Vbb of the module-side detectors 31a and 31b are within the third normal range R3 continuously for the period of time T1, the control in the uninterruptible power supply modules may be switched from the battery power supply control to the inverter power supply control. When these controls are performed, frequent switching can be further significantly reduced or prevented.

While the common detector and the module-side detectors detect the voltage values input to the uninterruptible power supply modules in each of the aforementioned first to third embodiments, the present invention is not restricted to this. That is, the common detector and the module-side detectors may alternatively detect current values input to the uninterruptible power supply modules.

While the disconnection switches are arranged in the common unit in each of the aforementioned first to third embodiments, the present invention is not restricted to this. For example, as in an uninterruptible power supply 700 according to a third modified example of the first to third embodiments shown in FIG. 11, a disconnection switch 722a may be arranged in an uninterruptible power supply module 701a instead of a common unit 702. A disconnection switch 722b may be arranged in an uninterruptible power supply module 701b instead of the common unit 702. In this case, in the uninterruptible power supply 700, the operation of the disconnection switch 722a (722b) may be controlled by a module-side controller 9a (9b) or may be controlled by a common controller 23 of the common unit 702.

What is claimed is:

1. An uninterruptible power supply comprising:
   an uninterruptible power supply module including a power converter;
   a first detector provided on an input side of the power converter, the first detector detecting a first detection value that is a value of a voltage or current input to the power converter;
   a second detector provided on an AC power supply side relative to the first detector, the second detector detecting a second detection value that is a value of a voltage or current input to the uninterruptible power supply module; and
   a controller configured to perform a power converter power supply control to supply power from an AC power supply to a load side via the power converter of the uninterruptible power supply module when the first detection value detected by the first detector is within a first normal range and the second detection value is within a second normal range, the controller being configured to perform a battery power supply control to control the uninterruptible power supply module to supply power from a battery to the load side when the second detection value is outside the second normal range.

2. The uninterruptible power supply according to claim 1, wherein
   the uninterruptible power supply module includes a plurality of uninterruptible power supply modules;
   the plurality of uninterruptible power supply modules is connected to the AC power supply in common;
   the first detector includes a plurality of first detectors provided on input sides of power converters of the plurality of uninterruptible power supply modules, respectively; and
   the second detector detects the second detection value in the AC power supply.

3. The uninterruptible power supply according to claim 2, wherein the controller is configured to perform the power converter power supply control to the supply power from the AC power supply to the load side via the power converters of the plurality of uninterruptible power supply modules when a plurality of first detection values detected by the plurality of first detectors is within the first normal range and the second detection value is within the second normal range, the controller being configured to perform the battery power supply control to control the plurality of uninterruptible power supply modules to the supply power from the battery to the load side when the second detection value is outside the second normal range.

4. The uninterruptible power supply according to claim 3, wherein the controller is configured to, when performing the power converter power supply control, perform a control to determine that the first detector of the uninterruptible power supply module, the first detection value of which is outside the first normal range, among the plurality of uninterruptible power supply modules is abnormal when the second detection value is within the second normal range.

5. The uninterruptible power supply according to claim 4, wherein the first normal range is set to a wider range than the second normal range.

6. The uninterruptible power supply according to claim 4, wherein
the plurality of uninterruptible power supply modules is connected to the battery that is common; and
the controller is configured to perform a control to stop power supply by the uninterruptible power supply module determined such that the first detector thereof is abnormal.

7. The uninterruptible power supply according to claim 4, wherein
the battery includes a plurality of batteries provided in the plurality of uninterruptible power supply modules, respectively; and
the controller is configured to perform a control to switch power supply by the uninterruptible power supply module determined such that the first detector thereof is abnormal, from the power converter power supply control to the battery power supply control.

8. The uninterruptible power supply according to claim 3, wherein the controller is configured to, when performing the power converter power supply control, perform a control to switch a control for the plurality of uninterruptible power supply modules from the power converter power supply control to the battery power supply control when the second detection value is outside the second normal range, and is configured to, when performing the battery power supply control, perform a control to switch the control for the plurality of uninterruptible power supply modules from the battery power supply control to the power converter power supply control when all the first detection values of the plurality of first detectors are within a third normal range that is narrower than the second normal range.

9. The uninterruptible power supply according to claim 3, wherein the controller is configured to, when performing the power converter power supply control, perform a control to switch a control for the plurality of uninterruptible power supply modules from the power converter power supply control to the battery power supply control when the second detection value is outside the second normal range and the first detection value of one of the plurality of first detectors is outside a third normal range that is narrower than the second normal range.

10. The uninterruptible power supply according to claim 3, wherein the controller is configured to, when performing the power converter power supply control, perform a control to switch a control for the plurality of uninterruptible power supply modules from the power converter power supply control to the battery power supply control when the second detection value is outside the second normal range, and is configured to, when performing the battery power supply control, perform a control to switch the control for the plurality of uninterruptible power supply modules from the battery power supply control to the power converter power supply control when all the first detection values of the plurality of first detectors are within the second normal range continuously for a predetermined period of time.

11. The uninterruptible power supply according to claim 2, wherein
the plurality of first detectors is arranged in housings of the plurality of uninterruptible power supply modules, respectively; and
the second detector is connected to a common conductor arranged outside the housings of the plurality of uninterruptible power supply modules, the common conductor being connected to the plurality of uninterruptible power supply modules.

12. The uninterruptible power supply according to claim 1, wherein
the first detector detects a voltage value input to the power converter as the first detection value; and
the second detector detects a voltage value input to the uninterruptible power supply module as the second detection value.

* * * * *